(12) United States Patent
Watson

(10) Patent No.: US 6,185,407 B1
(45) Date of Patent: Feb. 6, 2001

(54) METHOD FOR EVALUATING PERFORMANCE OF A LOW EARTH ORBIT SATELLITE SYSTEM

(75) Inventor: Jeffrey Lee Watson, Dallas, TX (US)

(73) Assignee: Nortel Networks Limited, Montreal (CA)

(*) Notice: Under 35 U.S.C. 154(b), the term of this patent shall be extended for 0 days.

(21) Appl. No.: 09/385,660

(22) Filed: Aug. 27, 1999

Related U.S. Application Data

(60) Provisional application No. 60/098,113, filed on Aug. 27, 1998.

(51) Int. Cl.[7] .................... H04B 1/60; H04B 17/02
(52) U.S. Cl. .................. 455/9; 455/12.1; 455/13.2; 455/427; 455/428
(58) Field of Search .................. 455/12.1, 9, 13.1, 455/13.2, 13.3, 427, 428, 429, 430, 436; 370/351, 400, 410; 340/827; 709/241, 239, 240

(56) References Cited

U.S. PATENT DOCUMENTS 5,537,679 * 7/1996 Crosbie et al. ............. 455/132
5,579,307 * 11/1996 Richetta et al. ............. 370/54
6,072,774 * 6/2000 Natarajan et al. ............. 370/231

* cited by examiner

Primary Examiner—Fan Tsang
(74) Attorney, Agent, or Firm—Bruce E. Garlick; James A. Harrison

(57) ABSTRACT

A method for evaluating the performance of a LEOS system. The evaluation may determine the minimum and maximum number of hops or delay time required to service a particular source and destination pair or may evaluate the LEOS system as a whole. The evaluation may be used in the design of LEOS systems or to evaluate the performance of an existing LEOS system. This evaluation may then be employed to determine how and when the LEOS system should be employed in servicing communications. A LEOS system constellation is received that is to be considered. Then, a mathematical model for the LEOS system is determined. A source/destination location pair is then selected for consideration. Shortest, longest and intermediate path lengths are then determined for the source/destination location pair for the LEOS system. For each of these path lengths, the probability of occurrence of each of these path lengths as well as a corresponding delay is then determined. Further source/destination location pairs may then be selected for additional consideration. Once a sufficient number of source/destination location pairs have been considered, the performance of the LEOS system may then be evaluated.

22 Claims, 7 Drawing Sheets

METHOD FOR EVALUATING PERFORMANCE OF A LOW EARTH ORBIT SATELLITE SYSTEM

CROSS-REFERENCE TO RELATED APPLICATION

The present application claims priority pursuant to 35 U.S.C. Sec. 119(e) to U.S. provisional application Ser. No. 60/098,113, filed Aug. 27, 1998, which is hereby incorporated herein by reference in its entirety.

BACKGROUND

1. Technical Field

The present invention relates generally to satellite communication networks, and more particularly to a methodology for evaluating performance of a low earth orbit satellite (LEOS) system.

2. Related Art

Satellite communication systems are generally known to facilitate wireless communications across most areas of the earth's surface. Satellite communication systems may provide wireless coverage for mobile subscriber units in areas that are served neither by the public switched telephone network (PSTN) nor by cellular communication systems. The satellite communication systems may also provide a high bandwidth routing path for voice and data communications.

In a satellite communication system, at least one satellite operates from an orbit above the earth's surface. International telecommunication satellites typically operate from a geo-stationary orbit (GEO) that is approximately 36,000 kilometers above earth. Alternatively, telecommunication satellites have also been implemented in orbits closer to earth in low earth orbit satellite (LEOS) systems at an altitude from 700 kilometers to 2,000 kilometers or medium earth orbit satellite (MEOS) systems at approximately 10,000 kilometers.

In a LEOS system, a plurality of satellites orbit the earth and together provide coverage across most areas of the earth's surface. As contrasted to a GEO system in which a single satellite provides coverage over a substantial geographic area for all times, in a LEOS system the coverage area of each orbiting satellite changes over time. Thus, a first LEOS system satellite will provide coverage for a geographic area during a first time period while another LEOS system satellite provides coverage for the geographic area for a second time period, etc.

In a typical LEOS configuration, satellites are organized into orbital planes. A plurality of satellites orbits the earth in the orbital plane such that the satellites pass near the south pole and the north pole during their orbits. The satellites of each orbital plane are substantially uniformly distributed about the orbital plane and, as a whole, provide coverage for a geographic area corresponding to the orbital plane. By providing a plurality of orbital planes, each of which is separated from adjacent orbital planes by a separation angle, communications across a significant portion of the earth's surface are supported.

The number of orbital planes, the number of satellites in each orbital plane, the separation of the orbital planes, the altitude of the satellites in each orbital plane, and the inclination of each orbital plane characterizes the "constellation" of the LEOS system. The constellation essentially describes the relative positions and motion of the satellites in the LEOS system.

The LEOS system is called upon to service terrestrial communications between source and destination. Sources and destinations are devices that couple communications to the LEOS system. A source or destination may be a wireless subscriber unit, an earth station that couples the LEOS system to the PSTN or another communication network, or any other wireless device that couples to one of the satellites.

In a LEOS system, communications are not only coupled from sources and destinations to satellites, but they may be coupled between satellites as well via intersatellite links (ISLs). For the purposes of overall communication path length evaluation, each ISL may be referred to as a "hop." Each hop consumes LEOS system resources and adds delay to the communication. Thus, it is desirable to minimize the number of hops within the LEOS system when coupling communications between sources and destinations. However, the number of hops between a first satellite servicing a source and a second satellite servicing a destination depends upon system routing behavior and the positions of the source and destination. System routing behavior is based not only upon programmed permissible connections between satellites but upon the LEOS system constellation as well.

In designing and operating a LEOS system, it is important to evaluate the behavior of the system. However, because of the dynamic nature of the satellites in the LEOS system and the time varying ISL connectivity within the LEOS system, it is difficult to evaluate the system's behavior. Thus, there is a need in the art for a methodology for evaluating system performance of the LEOS system.

SUMMARY OF THE INVENTION

To overcome the shortcomings of the prior systems and their operations, a method according to the present invention evaluates the performance of a LEOS system. The evaluation may simply determine the minimum and maximum number of hops required to service a particular source and destination pair. However, the evaluation may be for the LEOS system as a whole in which many differing source and destination pairs are considered. This evaluation may be used as a modeling tool in the design of LEOS systems. Further, this evaluation tool may also be used to evaluate the performance of a LEOS system that has already been built. This evaluation may then be employed to determine how and when the LEOS system should be employed in servicing communications.

In a particular operation according to the present invention, a LEOS system constellation is received that is to be considered. Then, a mathematical model for the LEOS system is determined. A source/destination location pair is then selected for consideration. Shortest, longest and intermediate path lengths are then determined for the source/destination location pair for the LEOS system. For each of these path lengths, the probability of occurrence of each of these path lengths as well as a corresponding delay is then determined. Further source/destination location pairs may then be selected for additional consideration. Once a sufficient number of source/destination location pairs have been considered, the performance of the LEOS system may then be evaluated.

Evaluation may include shortest, longest and intermediate path lengths (and corresponding delay times) for particular source/destination pairs. Further, the evaluation may provide average shortest, longest and intermediate path lengths for the LEOS system. These determinations may be employed for the uses described above.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
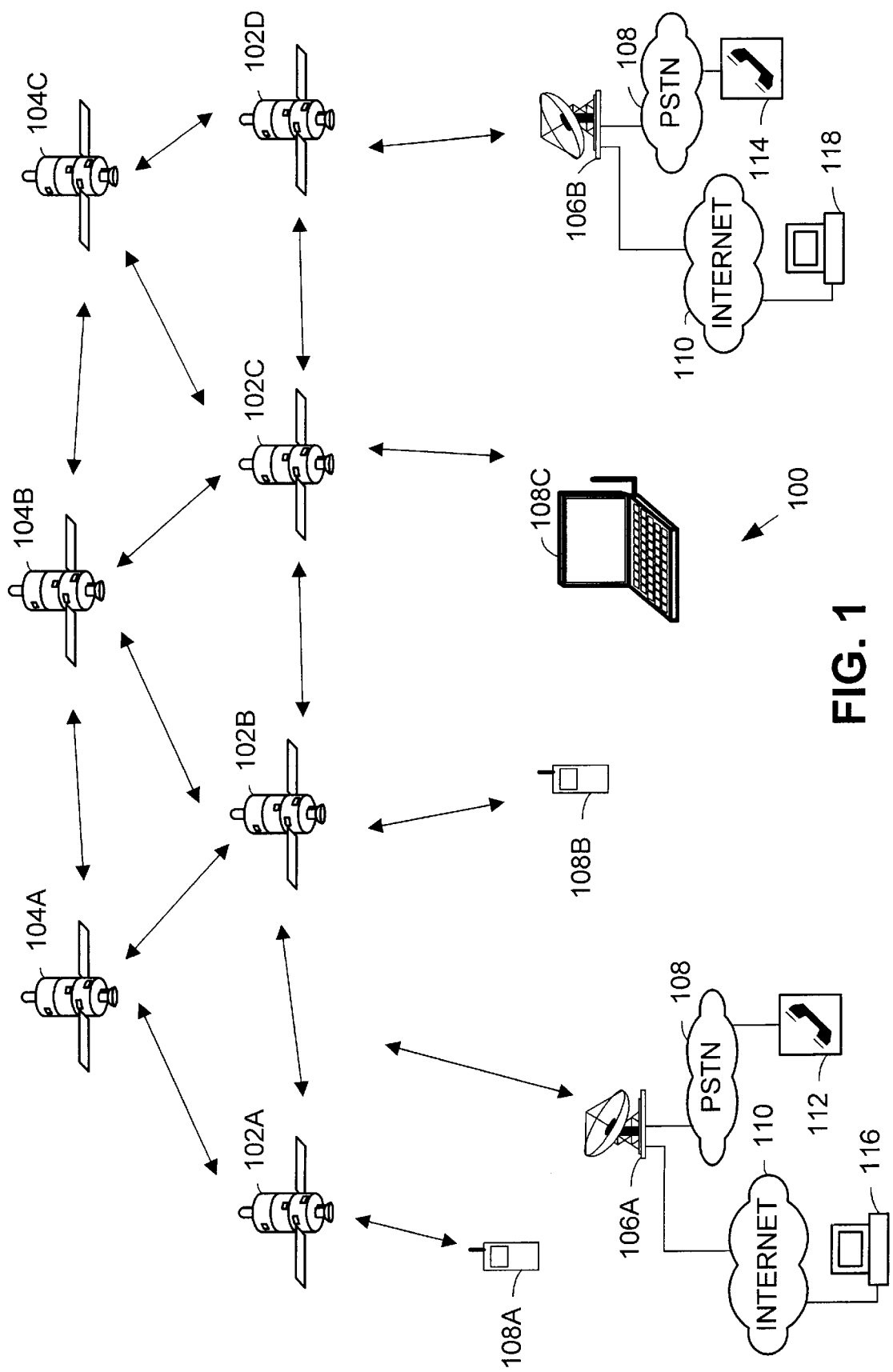
FIG. 1 is a system diagram generally illustrating some of the components of a low earth orbit satellite (LEOS) system, communication systems that couple to the LEOS system and a plurality of devices, the performance of which is evaluated according to a preferred embodiment of the invention.

FIG. 1 is a system diagram generally illustrating some of the components of a low earth orbit satellite (LEOS) system 100, communication systems that couple to the LEOS system and a plurality of source/destination devices, the performance of which is evaluated according to a preferred embodiment of the invention. In the LEOS system 100, a plurality of satellites 102A–102D and 104A–104C orbit the earth and, in combination with earth stations 106A and 106B, service communications for a plurality of wireless subscribing units 108A, 108B and 108C. The earth stations 106A and 106B couple to the Public Switched Telephone Network (PSTN) and the Internet 110 (or another packet switched network). With these interconnections, the LEOS system 100 facilitates communications between mobile wireless subscribing units 108A–108B, fixed wireless unit 108C, and with telephones 112 and 114 or computers 116 and 118, for example. The communication operations provided by the LEOS system 100 service both voice and data communications. These types of communications are generally known and will be described herein only to expand upon the teachings of the present invention.

The LEOS system satellites are organized into a plurality of satellite groups. Each satellite group orbits about the earth in an orbital plane (orbital plane). Within the orbital plane, the satellites of the satellite group are distributed as evenly as possible so that the angular position between each adjacent pair of satellites is substantially uniform. To provide global coverage, the orbital planes are highly inclined relative to the equator such that the angle formed between the orbital plane and the equatorial plane is greater than 70 degrees. The orbital planes are also distributed so that, at the equator, the distance between each adjacent pair of orbital planes is substantially uniform. In the example of FIG. 1, satellites 104A, 104B and 104C operate in a first orbital plane while satellites 102A, 102B, 102C and 102D operate in a second orbital plane.

The orbital characteristics of the satellites of a LEOS system are referred to as its "constellation." In the particular examples provided herein, the constellation of the LEOS system includes: (1) twelve orbital planes; (2) twenty-four satellites in each orbital plane; (3) 90° inclined orbits; (4) 15° separation among satellites within an orbital plane; (5) 15° separation of orbital planes; and (6) each satellite is responsible for a 15° by 15° non-overlapping coverage region. In this constellation, each satellite services a geographic area of the earth's surface. Because the satellites are orbiting the earth, however, the geographic area serviced by each satellite changes over time.

Each communication serviced by the LEOS system includes a source and a destination, the source and the destination each representing a terrestrial terminal or earth station. For example, when wireless subscribing unit 108B communicates with telephone 112, the source is earth station 106A while the destination is the wireless subscribing unit 108B. In the case of this communication, the earth station 106A is fixed with respect to the earth's surface. However, the wireless subscribing unit 108B may be mobile. In any case, the source and the destination reside a distance apart. In the case of the present example, the earth station 106A establishes a link with satellite 104A. Further, the wireless subscribing unit establishes a link with satellite 102B. Further, to service the communication, an intersatellite link (ISL) is established between satellite 102B and satellite 104A. Because this ISL is between satellites 102B and 104A of differing orbital planes causing it to be in a nominally east-west direction, this link is referred to as a sideways ISL or a "horizontal hop." ISLs between adjacent satellites in the same orbit are in a nominally north-south direction and are referred to as "vertical hops."

In another example, a communication is serviced between computer 118 coupled to the Internet 110 and wireless subscriber unit 108C. The communication passes from the Internet 110 to earth station 106B and then on a link to satellite 102D. The communication is then routed on a vertical hop between satellite 102D and satellite 102C and on a link to wireless subscriber unit 108C.

Because the satellites orbit the earth on a periodic basis, handoff must occur between satellites. Further, because relative positions of neighboring satellites change over time, sideways ISLs also change over time. According to the example discussed herein, sideways ISLs are shut off when either satellite reaches 60° latitude. Further, each satellite has six continuous ISLs constrained by the 60° limit. Two "East" ISLs connect to the two closest satellites in the adjacent orbital plane to the East and the two "West" ISLs connect to the two closest satellites in the adjacent orbital plane to the West. The "manual override" to select the longer ISL to a satellite that is offset by more than 15° is not considered.

The following terms are used throughout in describing the present invention:

Skew between orbital planes: This is the latitude of the subsatellite point of the closest satellite in the adjacent orbital plane to the East when the reference satellite crosses the equator. Aligned or synchronized orbital planes have a skew of zero. The probability distribution function for the skew between two orbital planes is nominally uniform over the range −7.5° to 7.5° and zero outside this range.

Offset between satellites: This is the latitude of the subsatellite point of a satellite in the orbital plane to the East when the reference satellite in the adjacent West orbital plane crosses the equator. The offset between the reference satellite and the closest satellite in the adjacent orbital plane is equal to the skew between orbital planes.

Horizontal hop: A path segment taken on a sideways ISL.

Vertical hop: A path segment taken on an ISL between satellites within an orbital plane.

Best available path: This is the path that results in the fewest number of hops between source and destination given the current configuration of the satellites.

Most favorable alignment: This is a set of skews and coverages that results in the minimum number of hops in the best available path.

Most unfavorable alignment: This is a set of skews and coverages that results in the maximum number of hops in the best available path.

Over the pole: Refers to the best available path that passes over the north or south pole. Over the pole path lengths are calculated for both the most favorable alignment and the most unfavorable alignment.

Around the world: Refers to a path that does not pass over the north or south pole. Around the world path lengths are calculated for both the most favorable alignment and the most unfavorable alignment.

Shortest Path: Better of the over the pole and around the world paths in the most favorable alignment.

Longest Path: Better of the over the pole and around the world paths in the most unfavorable alignment.

Figure 2A:
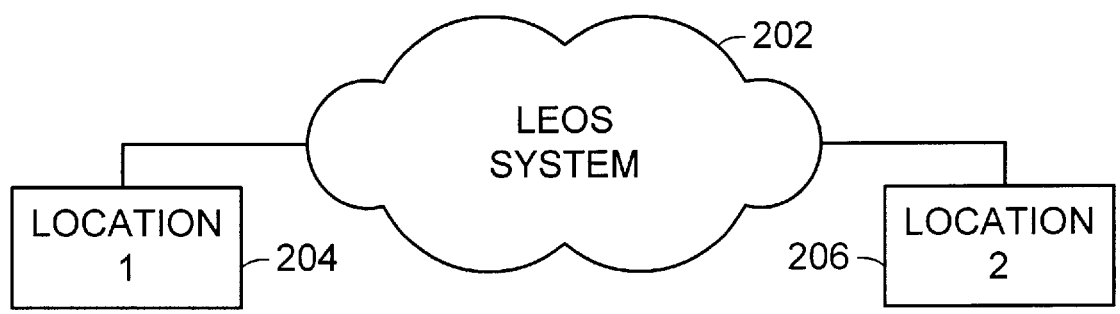
FIGS. 2A and 2B are functional block diagrams illustrating the manner in which the LEOS system of FIG. 1 may be used to support communications.
Figure 2B:
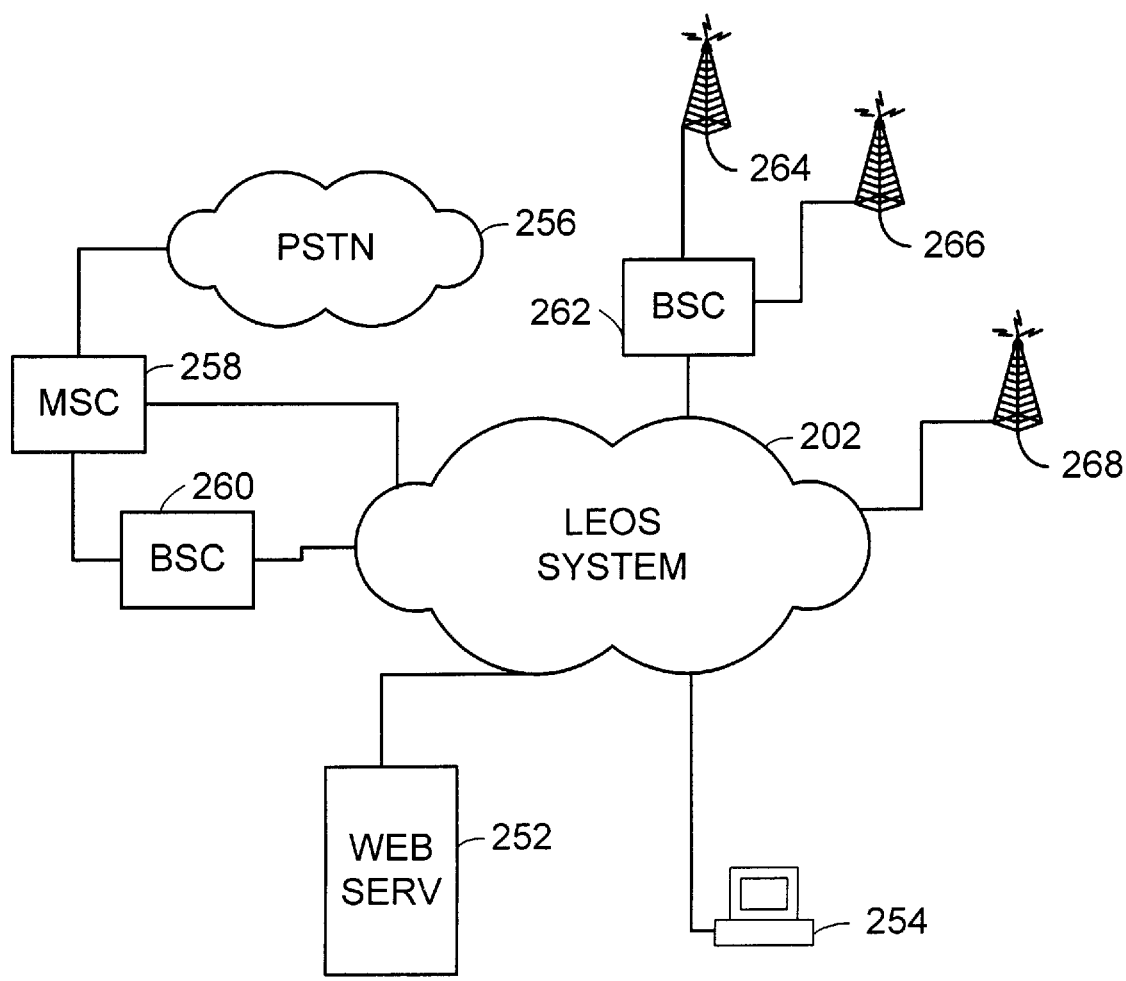

FIGS. 2A and 2B are functional block diagrams illustrating the manner in which the LEOS system of FIG. 1 may be used to support communications. For many communications, the LEOS system provides the only communication option. An example of such a communication scenario occurs when a subscriber travels away from the PSTN infrastructure and any available cellular infrastructure. In such case, the LEOS system is the only available communication system. In another scenario, however, the LEOS system provides a backup communication service to augment cellular or PSTN service. In still another scenario, the LEOS system provides superior service as compared to other communication options and the LEOS system is the preferred communication system.

With particular reference to FIG. 2A, in its simplest incarnation, a LEOS system 202 services communications between location 1 204 and location 2 206. Since the LEOS system 202 supports global communications, location 1 204 and location 2 206 may be located at almost any point on the earth's surface. Once a communication link is established, the LEOS system 202 supports the communication to completion. However, because the satellites of the LEOS system 202 orbit the earth, the LEOS system 202 provides an infrastructure that is neither fixed with respect to location 1 204 or with respect to location 2 206. Thus, the delay introduced by the LEOS system 202 will vary over the duration of any serviced communication.

This variation in delay is a result of the varying number of hops required for communications passing through the LEOS system 202. Further, because the distance between satellites for a particular communication path varies over time, even when the number of hops remains static, the delay introduced for transmission delays will also vary over time. In the present embodiment, the LEOS system includes satellites that route communication in a packet switched manner. Assuming that a constant delay is produced in each switching operation within a satellite, the variation in delay may be attributed to the varying number of ISL hops and the varying distances of the hops.

Referring now to FIG. 2B, the LEOS system services various types of communications. When servicing communications between a web server 252 and a computer 254, for example, the LEOS system 202 introduces a delay. The communication protocols employed in servicing these communications may be susceptible to delays or delay variations that exceed an upper limit. Thus, it may be important to evaluate this communication path from the aspect of delay. According to the present invention, this communication path is evaluated and the path characteristics are employed in servicing the communication.

Further, in some implementations, the LEOS system 202 may service communications between a base station controller (BSC) and a remotely located base station 268. The LEOS system 202 may also service communications between a mobile switching center (MSC) 258 that couples to the PSTN 256 and a remotely located cellular network segment that includes a BSC 262 and base stations 264 and 266. In another operation, the LEOS system 202 provides backup communication service for these devices. In either case, because the LEOS system 202 services these communications, it is important that the service it will provide be evaluated. Operation according to the present invention is employed to evaluate this service.

Figure 3:
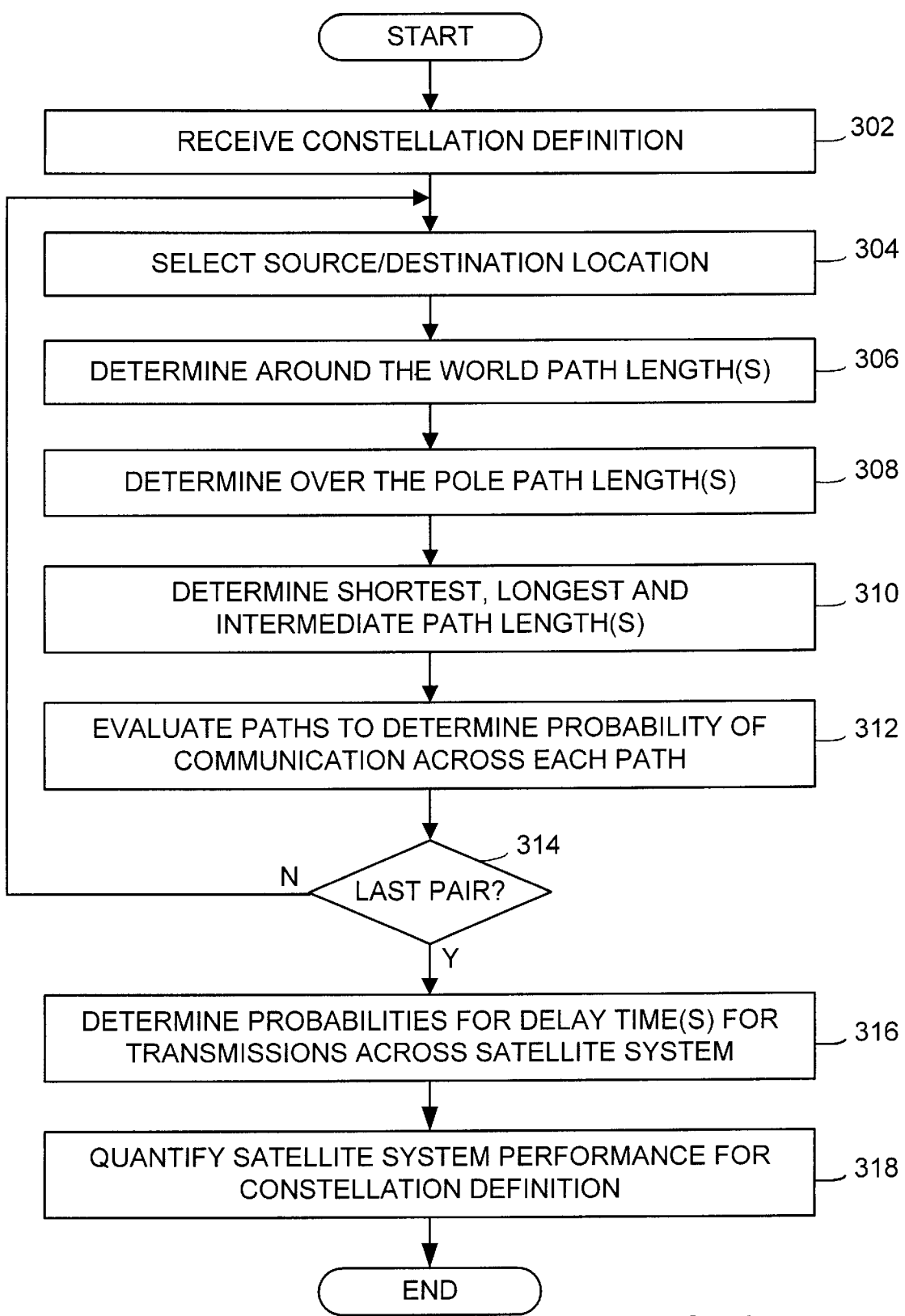
FIG. 3 is a logic diagram illustrating operation according to the present invention in evaluating performance of a LEOS system.

FIG. 3 is a logic diagram illustrating operation according to the present invention in evaluating performance of a LEOS system. The operation of FIG. 3 may be incorporated with further operations in the design of a LEOS system constellation and/or in evaluating the performance of a LEOS system after its construction. The operations described with reference to FIG. 3 are typically performed using a digital computer. In such case, the operation is embodied in software instructions that are received and processed by the digital computer. The results of the operation are then output for further use. These software instructions may be embodied upon a storage device such as one or more floppy diskettes, CD ROMs, DVDs, magnetic tapes and other portable storage devices. Further, these software instructions may be embodied in a hard disk drive, ROM, RAM and other types of storage devices and/or memory contained in a digital computer. The structure and operation of digital computers is generally known and will not be discussed further. However, software instructions embodying the present invention will include instructions for accomplishing the operations of the present invention.

Operation commences when the constellation definition is received (step 302). The constellation definition will include at least the number of orbital planes, the number of satellites in each orbital plane, the altitude of the satellites in each orbital plane, the spacing of the satellites in each orbital plane (if not uniform) and the relative position of each orbital plane. Next, source/destination location pair is selected for consideration. As will be discussed, in evaluating performance of the LEOS system, a large number of source/destination location pairs are selected and operation of the LEOS system is evaluated for each pair. Then, the individual results are considered to provide an overall system characteristic.

Next, the around the world path length(s) are determined for the source/destination pair (step 306). The around the world path does not pass over either pole. Then, the over the pole path length(s) is determined for the source/destination pair (step 308). As indicated, this path will pass over one of the poles. Then, the shortest, longest and intermediate path length(s) for the source/destination pair is determined (step 310).

Figure 6:
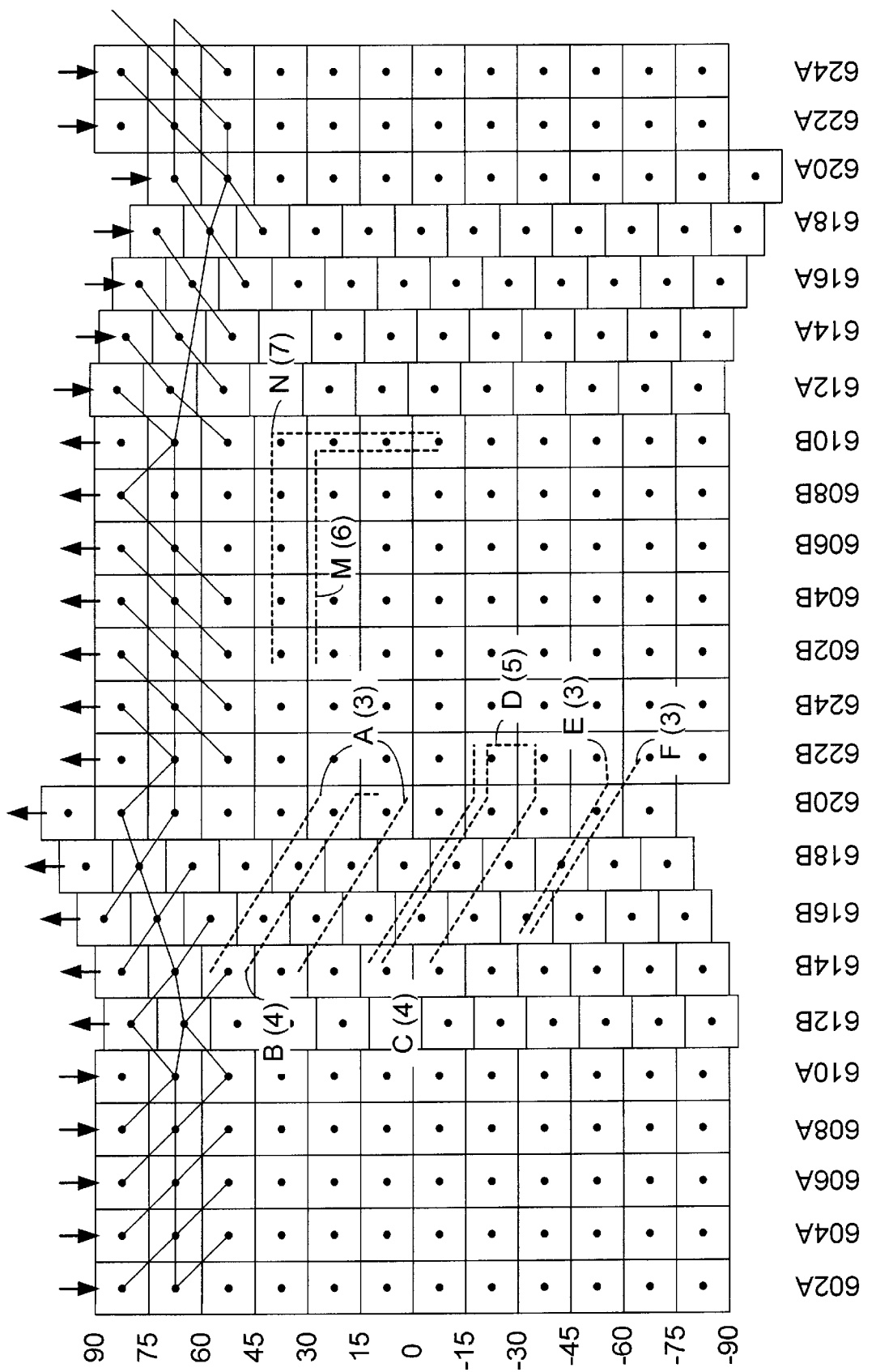
FIG. 6 is a constellation representation of a LEOS system illustrating communication paths between source and destination and the manner in which communication paths vary over time.

In considering these differing paths, consider the chart of FIG. 6. The sideways ISL connectivity for all satellites in a column (half orbital plane) is shown by connectivity of the second satellite in each column. The second row is used only to illustrate the pattern since the satellites at this latitude will quite likely have the sideways ISLs shut off.

To illustrate the calculation of the maximum path, each pair of orbital planes in the center of FIG. 6 has a very small negative skew. The longer eastward horizontal hop for each satellite connects it to the satellite to the Northeast. For the purpose of the following discussion, it is assumed, without loss in generality, that the source is on the left and the destination is on the right.

For simplicity, consider longitude separation and latitude separation independently. The number of horizontal hops between a source and a destination at the same latitude is a function of the difference in longitude and the specific location of the seams between orbital planes. The satellite footprint is 15° across, so a source and destination separated by as much as 15° will occasionally be covered by a single satellite. Conversely, the source and destination could have a very small longitude separation and still not fall into the coverage area of the same satellite. Thus they will occasionally not be covered by the same satellite and a horizontal hop will be required. The following equations provide the step-wise nature of the number of horizontal hops based on the separation in longitude:

$$0 \text{ or } 1 \quad 0° < \text{E-W separation} < 15° \quad \text{Equation (1)}$$

$$1 \text{ or } 2 \quad 15° < \text{E-W separation} < 30° \quad \text{Equation (2)}$$

$$2 \text{ or } 3 \quad 30° < \text{E-W separation} < 45° \quad \text{Equation (3)}$$

$$n \text{ or } n+1 \quad n \times 15° < \text{E-W separation} < (n+1) \times 15° \quad \text{Equation (4)}$$

Similarly, ignoring the separation in longitude, the number of vertical hops will be:

$$0 \text{ or } 1 \quad 0° < \text{N-S separation} < 15° \quad \text{Equation (5)}$$

$$1 \text{ or } 2 \quad 15° < \text{N-S separation} < 30° \quad \text{Equation (6)}$$

$$2 \text{ or } 3 \quad 30° < \text{N-S separation} < 45° \quad \text{Equation (7)}$$

$$n \text{ or } n+1 \quad n \times 15° < \text{N-S separation} < (n+1) \times 15° \quad \text{Equation (8)}$$

Next, the longitude and latitude are considered simultaneously. In the most unfavorable alignment of satellite orbital planes, the horizontal hops will result in no progress in the desired latitude direction. In the most favorable alignment of satellite orbital planes, the horizontal hops will result in significant progress in the desired latitude direction. Table 1 includes results of a particular source/destination pair under consideration. The maximum number of horizontal hops (max lon hops) and the maximum number of vertical hops (max lat hops) are those values determined by investigating each independently. The maximum number of hops is simply the sum of these two.

The latitude progress that occurs in horizontal hops must be evaluated to find the minimum number of hops. Each horizontal hop can reduce the latitude separation that must be covered in vertical hops by as much as 15°. The maximum latitude gain (max lat gain) possible with the horizontal hops in the minimum hop path is equal to the minimum number of horizontal hops multiplied by 15°. The useful latitude gain (useful lat gain) due to horizontal hops is the lesser of the latitude separation and the maximum latitude gain. The total latitude that must be covered by latitude hops is the latitude separation minus this useful latitude gain.

In the example in the table, the 5 longitude hops provide a useful latitude gain of 75°. Thus only 13° of latitude must be covered by latitude hops. The minimum number of hops required to cover this separation is 0 based on the same reasoning used to determine the number of vertical hops independent of longitudinal separation. The minimum number of hops is then the minimum number of longitude hops plus the minimum number of latitude hops.

TABLE 1

Around the World Calculations

| Lat Sep | Lon Sep | Min Lon Hops | Max Lon Hops | Max Lat Gain | Useful Lat Gain | Min Lat Hops* | Max Lat Hops | Min Hops | Max Hops |
|---|---|---|---|---|---|---|---|---|---|
| 88 | 88 | 5 | 6 | 75 | 75 | 0 | 6 | 5 | 12 |

For the over the pole path, the same basic calculations are used for the number of vertical and horizontal hops as described for the around the world path. However, the latitude and longitude separations used for the calculation are different. The latitude separation is based on passing over the pole that gives the better path. For instance, if both source and destination are in the Southern Hemisphere, the path will pass over the South pole. The equation for this is:

$$\text{Latitude Separation} = 180 - |\text{latS} + \text{latD}| \text{ (latS and latD are the source and destination latitude)} \quad \text{Equation (9)}$$

The longitude changes by 180° passing over the pole. The longitude separation is the angular distance remaining in the path after crossing the pole. This is given by:

$$\text{Longitude Separation} = 180 + \text{lonS} - \text{lonD} \text{ (assuming lonS} < \text{lonD} < 180) \quad \text{Equation (10)}$$

$$\text{Longitude Separation} = \text{mod}(540 + \text{lonS} - \text{lonD}, 360) \text{ generalized to } (0 < \text{lonX} < 360) \quad \text{Equation (11)}$$

Using these separations, the calculation of the maximum number of hops is identical to the around the world case.

The sideways ISLs are assumed to be turned off above 60° latitude. This has the effect that the over the pole path will include vertical hops to cover 60° of latitude separation passing over the pole from 60° N latitude, X° longitude to 60° N latitude X+180° longitude. Thus, the latitude gain due to horizontal hops can be no more than the latitude separation minus this 60°. The maximum latitude gain (max lat gain) possible with the horizontal hops in the minimum hop path is equal to the minimum number of horizontal hops multiplied by 15°. The useful latitude gain (useful lat gain) due to horizontal hops is the lesser of the latitude separation minus 60° and the maximum latitude gain. The total latitude that must be covered by latitude hops is the latitude separation minus this useful latitude gain.

Table 2 summarizes the over the pole path. The shorter path over the pole has 148° of latitude separation. Once over the pole, 92° of longitude separation remains, which will require at minimum 6 horizontal hops. In these 6 hops, as much as 90° of latitude could be gained as well. However, the useful latitude gain is 148°−60°=88°.

TABLE 2

Over the Pole Calculations

| Over the Pole | | | | | Use- | | | | |
|---|---|---|---|---|---|---|---|---|---|
| Lat Sep | Lon Sep | Min Lon Hops | Max Lon Hops | Max Lat Gain | ful Lat Gain | Min Lat Hops* | Max Lat Hops | Min Hops | Max Hops |
| 148 | 92 | 6 | 7 | 90 | 88 | 4 | 10 | 10 | 17 |

For the examples given in the previous sections, which consider a source at −60° latitude, 0° longitude and a destination at 28° latitude and 88° longitude, the shortest and longest paths are both around the world and are 5 and 12 hops respectively.

And just because they are aligned in that condition, does not necessarily mean that the particular coverage will require the additional hop, i.e., only at the instant when the trailing edge of the satellite footprint covering the source is at the source does the condition apply. When that trailing edge is 0.25 degree south of the source, then only 0.75 degree of latitude change is necessary.

Referring again to FIG. 3, when each potential path has been determined, a probability of communication is assigned for each path. The probability that in N horizontal hops that it is not possible to also move at least Θ degrees in the desired latitude direction (north or south):

$$= \left(\frac{1}{15}\right)^N \times \left(\frac{\Theta^N}{N!}\right) \quad \text{Equation (12)}$$

For instance, consider the example of the previous section where the unfavorable ISL connectivity resulted in requiring a vertical hop in addition to the 5 horizontal hops between a source and destination that are almost at the same latitude. Assume that the 2 points have a latitude separation of 1 degree. Then the preceding equation says that the likelihood that the 6 orbital planes of satellites are aligned in this unfavorable of a condition is:

$$= \left(\frac{1}{15}\right)^5 \times \left(\frac{1^5}{5!}\right) = 1.1 \times 10^{-8} \quad \text{Equation (13)}$$

And just because they are aligned in that condition, does not necessarily mean that the particular coverage will require the additional hop, i.e., only at the instant when the trailing edge of the satellite footprint covering the source is at the source does the condition apply. When the trailing edge is 0.25 degree south of the source, then only 0.75 degree of latitude change is necessary. This methodology may be applied to calculate the probability of the shortest, longest and intermediate path lengths at step 312.

As was discussed multiple source/destination locations are considered to evaluate the performance of the LEOS system. Thus, if the current source/destination pair under consideration is not the last (as determined at step 314) operation returns to step 304 for the next source/destination pair. If not, additional calculations are performed to evaluate the performance of the LEOS system. These additional calculations associate delay times for the shortest, longest and intermediate path lengths that were calculated at step 310. Knowledge of the capacity of each satellite, the physical separation of the satellites along the paths and the velocity of propagation of the signal between satellites are used to place bounds and probabilities on communication delays introduced by the LEOS system. With these delays calculated, the system performance for the constellation definition (and construction) may then be quantified (step 318).

Figure 4:
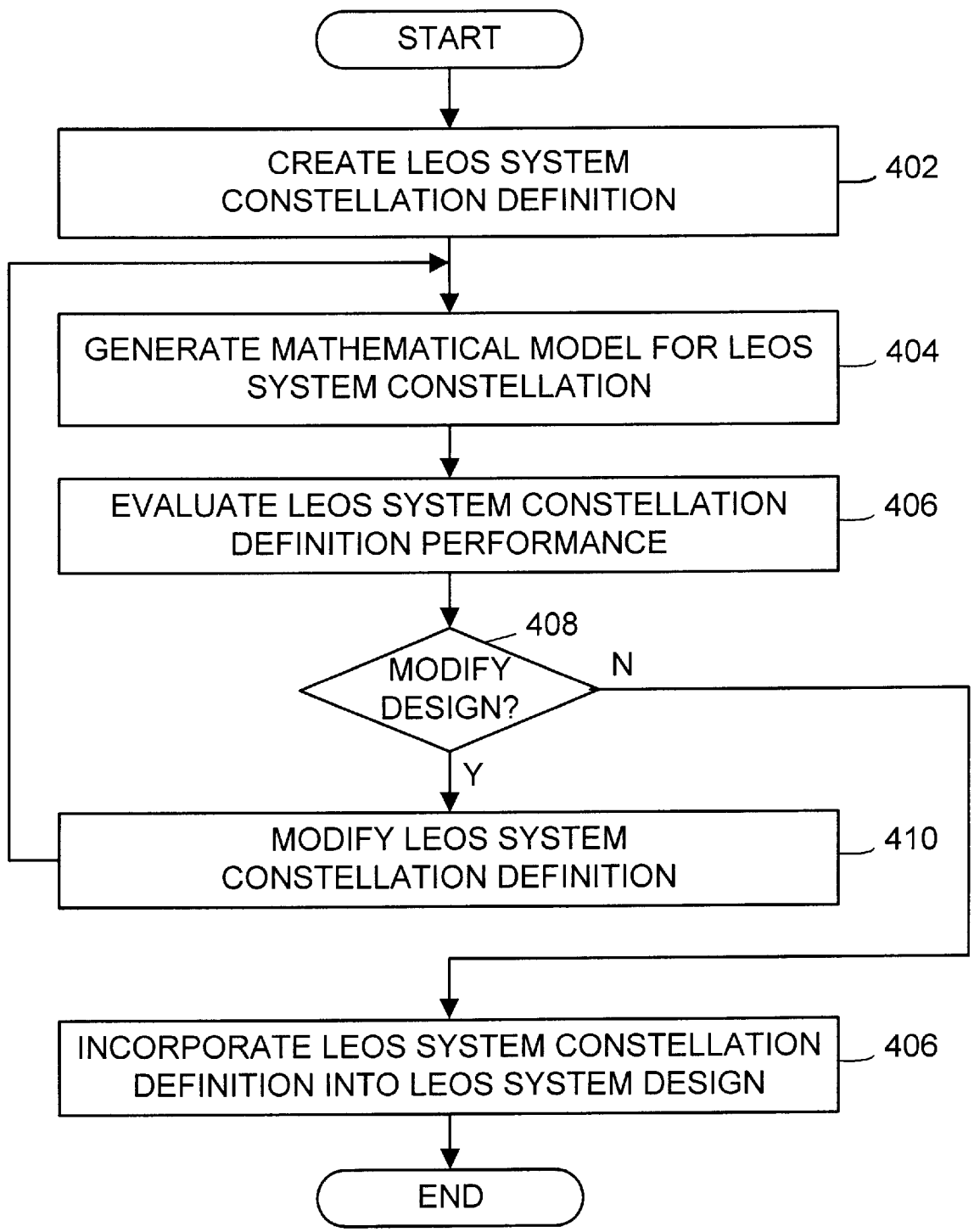
FIG. 4 is a logic diagram illustrating operation in which LEOS system design is evaluated according to the present invention and in which the evaluation produced is employed in modifying the design of the LEOS system.

FIG. 4 is a logic diagram illustrating operation in which LEOS system design is evaluated according to the present invention and in which the evaluation produced may be employed in modifying the design of the LEOS system. Operation commences wherein the LEOS system constellation definition is initially created (step 402). Then, a mathematical model for the LEOS system constellation is generated (step 404) and evaluated (step 406). Step 406 performs steps 304 through 314 of FIG. 3. Thus, after execution of step 406, the constellation definition created. at step 402 has been evaluated.

At step 408, it is determined whether the LEOS system constellation definition was sufficient. This determination considers the delay and delay variation in communications serviced by the LEOS system, the number of hops and variation in the number of hops required for communications passing across the LEOS system, or it may be based upon another criteria. If modification of the LEOS system constellation definition requires modification (is not sufficient), the LEOS system constellation definition is modified (step 410) and operation returns to step 404. If the design is sufficient and requires no further modification, the LEOS system constellation design is incorporated into an actual system design.

Figure 5:
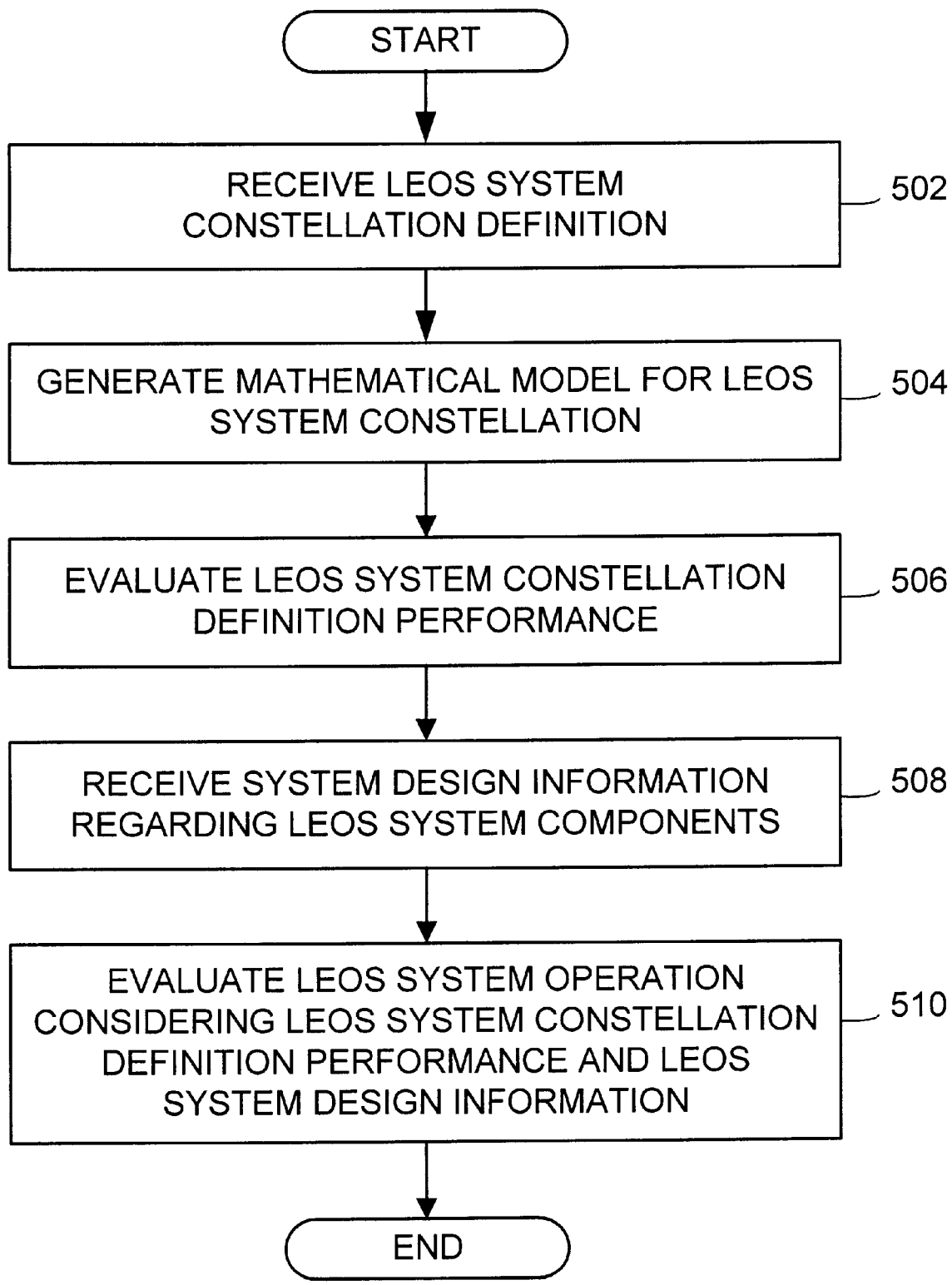
FIG. 5 is a logic diagram illustrating operation according to the present invention in which LEOS system evaluation is employed to evaluate the performance of an existing LEOS system.

FIG. 5 is a logic diagram illustrating operation according to the present invention in which the LEOS system evaluation is employed to evaluate the performance of an existing LEOS system. As a first step, the LEOS system constellation definition is received (step 502). Then, a mathematical model for the LEOS system constellation is generated (step 504) and evaluated (step 506). Step 506 performs steps 304 through 314 of FIG. 3. Thus, after execution of step 506, the constellation definition received at step 502 has been evaluated. Then, the system design information for the satellite system is received (step 508) and evaluated (step 510). Results produced at step 510 may be employed in adjusting operation of a system (e.g., wireless cellular system, Internet connection, etc.) that uses the LEOS system for communications.

FIG. 6 is a constellation representation of a LEOS system illustrating communication paths between source and destination and the manner in which communication paths vary over time. Vertical columns each represent one-half of a orbital plane orbit of the LEOS system. The columns having arrows pointing up (602B–624B) are the south-to-north moving halves of the orbital planes while the columns having arrows pointing down (602A–624A) are the north-to-south moving halves of the orbital planes. Each column representing a north-to-south moving half of an orbital plane corresponds to a column representing a south-to-north moving half of an orbital plane. For example, column 602A represents a north-to-south moving half of an orbital plane while column 602B represents the south-to-north moving half of the orbital plane. A seam is defined where a north-to-south moving orbital plane is adjacent a south-to-north moving orbital plane, e.g., 610A/612B and 610B/612A. In FIG. 6, the sideways ISL connectivity for all satellites in a column (half plane) is shown by connectivity of second satellite in the column. The second row is used only to give the pattern because the satellites at this latitude will quite likely have the sideways ISLs shut off.

As illustrated, there are 24 satellites in each orbital plane and there are 12 orbital planes in total. Thus adjacent satellites in the same orbital plane are separated by 15° relative to the center of the earth. The coverage and alignment of the satellites changes as the satellites move relative to a source and destination and relative to one another. Three components of the LEOS system constellation motion are considered in the following example:

1) North or South (vertical) motion of a satellite as it passes a user site;
2) Westward (horizontal) motion of the seam between satellite orbital planes as the earth rotates; and
3) Shifting of the alignment of orbital planes due to different orbital altitudes.

The orbital period of a satellite in the LEOS system constellation at 1375 km is 6794.0 seconds and the nominal separation between each of the satellites in an orbital plane is 283 seconds. Thus, every 283 seconds, a site will be handed from one satellite to the next within an orbital plane.

The earth rotates at 15° per hour. The coverage boundaries move west at this rate. Since the width of the orbital plane coverage is 15° longitude, a site will be handed from one orbital plane to the next orbital plane every hour. This handoff from orbital plane to orbital plane will occur for both the source and destination sites, but it is unlikely that the two handoffs will occur simultaneously. As a result, for part of each hour, the two sites will be separated by X orbital planes and for the remainder of the hour they will be separated by X+1 orbital planes.

The orbital period at 1377 km is 6796.7 seconds, which is 2.7 seconds longer than the orbital period at 1375 km. Thus, in just over 100 orbits, the offset will shift by 15° (satellites within an orbital plane are separated by 15° corresponding to 283 seconds, which is the advance the lower orbital plane makes on the higher orbital plane in 283/2.7=105 orbits.) In a half orbit, the offset changes by less than a tenth of a degree. One result of this is that the sideways ISLs for each satellite can be chosen prior to each ascending pass and do not need to be changed during the pass. The shift determines the alignment of orbital planes, which has the impact detailed in the preceding sections upon the path length. However, for the following, it is assumed that the alignment and connectivity of the orbital planes is constant while the short term effects of the vertical motion of the satellite and the horizontal motion of the seam are considered.

First, consider only the vertical motion of the satellites. A particular path (which is the best available path) between the source and destination through the constellation will be used until either the source or the destination are handed off to another satellite. Call this path A. Both will be handed off once every 283 seconds due to the satellite vertical motion. However, it is unlikely that the handoffs will occur at the same time. When one is handed off, a new path, which will have one more, one less, or the same number of hops as the first path will be used. Call this path B. Then, once the second site is handed off, a path parallel to and containing the same number of hops as path A will be used. In 283 seconds, path A will be used for X seconds and path B will be used for 283−X seconds. The next 283 seconds, path A' will be used for X seconds and path B' will be used for 283−X seconds.

Now, consider the horizontal motion of the seam. The pair of paths, A and B described in the previous paragraphs will be used until either the source or the destination are handed off to a satellite in the next orbital plane. Then a new pair of paths, C and D, will be used. In general, the number of hops will increase if this handoff resulted in an increase in the number of satellite seams between the source and destination and will decrease if it resulted in a decrease in the number of seams. However, the alignment of the orbital planes may be such that this general rule does not hold. In an hour, paths A and B will be used for Y seconds, then paths C and D will be used for 3600−Y seconds. Then paths E and F will be used for Y seconds followed by G and H for 3600−Y seconds.

Several additional path examples are also shown in FIG. 6. For simplicity, the frame of reference is the satellite constellation. The source/destination pairs all have the same separation. The path length flips back and forth between 3 and 4 as the path used changes from A to B and back again. Then the path length flips back and forth between 4 and 5 for paths C and D. However, the path length does not change as the path alternates between E and F. The instantaneous path length change appears to be limited to ±2 hops at an orbital plane change.

As shown in FIG. 6, the path can change from the most favorable condition to the most unfavorable in a number of hours equal to the number of hops difference between the maximum and minimum path. In this case, the minimum is 3, the maximum is 7, and path N will occur roughly 4 hours after E.

Figure 7:
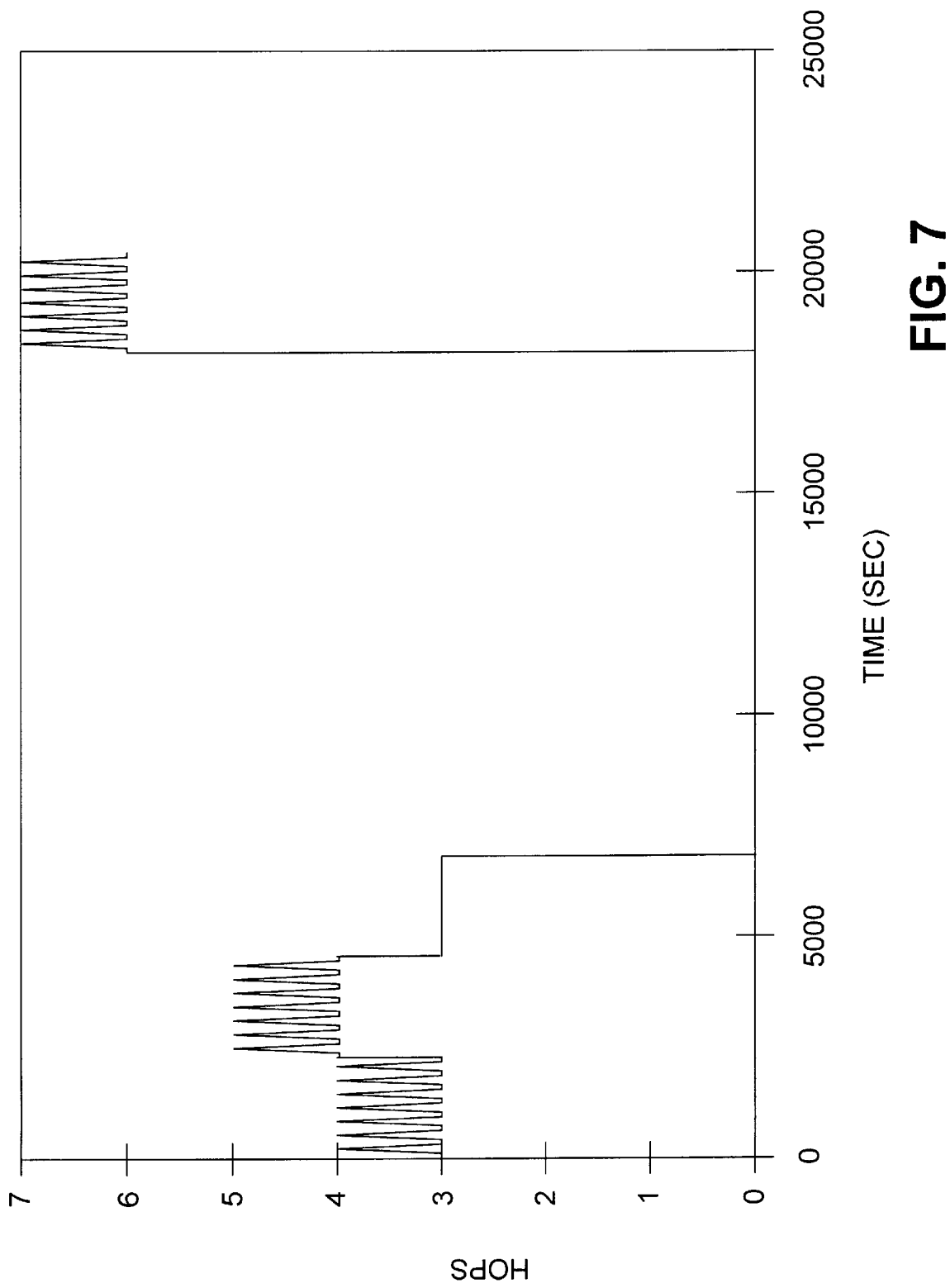
FIG. 7 is a graph illustrating the manner in which communication path lengths change over time for the source/destination pair shown in FIG. 6.

FIG. 7 is a graph illustrating the manner in which communication path lengths change over time for the source/destination pair shown in FIG. 6. In the constellation representation, each block represents a particular satellite in the system for a particular point in time. The horizontal separation of the source and destination is such that Y is approximately 1800 seconds. Each hour, the path flips between one pair for 30 minutes and then between the next pair for the remaining 30 minutes. The vertical separation is such that in pairs A/B and C/D, X is approximately 56 seconds (20%). X is 0 for pair E/F and it is 112 seconds (40%) for pair M/N. For the A/B pair, the path length is 3 for 231 seconds and then 4 for 56 seconds. This repeats six times in the 30 minutes. The path length was only calculated for the 4 pairs. Thus the blank portion in the center of the plot between values for path pair E/F and pair M/N.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for evaluating the performance of a low earth orbit satellite system, the method comprising:

receiving a low earth orbit satellite constellation for the low earth orbit satellite system;

considering a source and a destination;

determining a shortest path length employed to service a communication between the source and the destination;

determining the longest path length employed to service a communication between the source and the destination; and determining the probability of occurrence of both the shortest path length and the longest path length to produce an evaluation of the low earth orbit satellite system.

2. The method of claim 1, further comprising combining the probability of occurrence of the shortest path length and the longest path length to produce an overall evaluation of the low earth orbit satellite system.

3. The method of claim 1, further comprising:
   determining delays associated with the shortest path length and the longest path length; and
   combining the probability of occurrence of the shortest path length and the longest path length and the delays associated with the shortest path length and the longest path length to produce an overall evaluation of the low earth orbit satellite system.

4. The method of claim 1, further comprising:
   determining at least one intermediate path length employed to service a communication between the source and the destination; and
   determining the probability of occurrence of the at least one intermediate path length.

5. The method of claim 4, further comprising combining the probability of occurrence of the shortest path length, the longest path length and the at least one intermediate path length to produce an overall evaluation of the low earth orbit satellite system.

6. The method of claim 4, further comprising:
   determining delays associated with the shortest path length, the longest path length and the at least one intermediate path length; and
   combining the probability of occurrence of the shortest path length, the longest path length and the at least one intermediate path length and the delays associated with the shortest path length, the longest path length and the at least one intermediate path length to produce an overall evaluation of the low earth orbit satellite system.

7. The method of claim 1, wherein a path length includes a number of intersatellite hops between the source and the destination.

8. The method of claim 1, further comprising modifying the low earth orbit satellite constellation based upon the evaluation.

9. The method of claim 1, further comprising determining whether the low earth orbit satellite system provides sufficient performance for a communication between the source and the destination based upon the evaluation.

10. A method for evaluating the performance of a low earth orbit satellite system, the method comprising:
    receiving a low earth orbit satellite constellation for the low earth orbit satellite system;
    considering a plurality of source and destination pairs;
    for each source and destination pair:
    determining a shortest path length employed to service a communication between the source and the destination;
    determining the longest path length employed to service a communication between the source and the destination; and
    determining the probability of occurrence of both the shortest path length and the longest path; and
    combining the probability of occurrence of the shortest path length and the longest path length for the plurality of source and destination pairs to produce an overall evaluation of the low earth orbit satellite system.

11. The method of claim 10, further comprising:
    for each source and destination pair, determining delays associated with the shortest path length and the longest path length; and
    combining the probability of occurrence of the shortest path length and the longest path length for each source and destination pair and the delays associated with the shortest path length and the longest path length for each source and destination pair to produce an overall evaluation of the low earth orbit satellite system.

12. The method of claim 10, further comprising, for each source and destination pair:
    determining at least one intermediate path length employed to service a communication between the source and the destination; and
    determining the probability of occurrence of the at least one intermediate path length.

13. The method of claim 12, further comprising combining the probability of occurrence of the shortest path length, the longest path length and the at least one intermediate path length for each source and destination pair to produce an overall evaluation of the low earth orbit satellite system.

14. The method of claim 12, further comprising:
    for each source and destination pair, determining delays associated with the shortest path length, the longest path length and the at least one intermediate path length; and
    combining the probability of occurrence of the shortest path length, the longest path length and the at least one intermediate path length for each source and destination pair and the delays associated with the shortest path length, the longest path length and the at least one intermediate path length for each destination pair to produce an overall evaluation of the low earth orbit satellite system.

15. The method of claim 10, wherein a path length includes a number of intersatellite hops between the source and the destination.

16. The method of claim 10, further comprising modifying the low earth orbit satellite constellation based upon the evaluation.

17. A computer readable medium that contains software instructions that, upon execution by a digital computer, causes the digital computer to evaluate the performance of a low earth orbit satellite system, the computer readable medium comprising:
    a plurality of software instructions that cause the digital computer to receive a low earth orbit satellite constellation for the low earth orbit satellite system;
    a plurality of software instructions that cause the digital computer to consider a source and a destination;
    a plurality of software instructions that cause the digital computer to determine a shortest path length employed to service a communication between the source and the destination;
    a plurality of software instructions that cause the digital computer to determine the longest path length employed to service a communication between the source and the destination; and
    a plurality of software instructions that cause the digital computer to determine the probability of occurrence of both the shortest path length and the longest path length to produce an evaluation of the low earth orbit satellite system.

18. The computer readable medium of claim 17, further comprising:
    a plurality of instructions that cause the digital computer to combine the probability of occurrence of the shortest path length and the longest path length to produce an overall evaluation of the low earth orbit satellite system.

19. The computer readable medium of claim 17, further comprising:
   a plurality of instructions that cause the digital computer to determine delays associated with the shortest path length and the longest path length; and
   a plurality of instructions that cause the digital computer to combine the probability of occurrence of the shortest path length and the longest path length and the delays associated with the shortest path length and the longest path length to produce an overall evaluation of the low earth orbit satellite system.

20. The computer readable medium of claim 17, further comprising:
   a plurality of instructions that cause the digital computer to determine at least one intermediate path length employed to service a communication between the source and the destination; and
   a plurality of instructions that cause the digital computer to determine the probability of occurrence of the at least one intermediate path length.

21. The computer readable medium of claim 20, further comprising a plurality of instructions that cause the digital computer to combine the probability of occurrence of the shortest path length, the longest path length and the at least one intermediate path length to produce an overall evaluation of the low earth orbit satellite system.

22. The computer readable medium of claim 20, further comprising:
   a plurality of instructions that cause the digital computer to determine delays associated with the shortest path length, the longest path length and the at least one intermediate path length; and
   a plurality of instructions that cause the digital computer to combine the probability of occurrence of the shortest path length, the longest path length and the at least one intermediate path length and the delays associated with the shortest path length, the longest path length and the at least one intermediate path length to produce an overall evaluation of the low earth orbit satellite system.

* * * * *